United States Patent Office 3,280,313
Patented Oct. 18, 1966

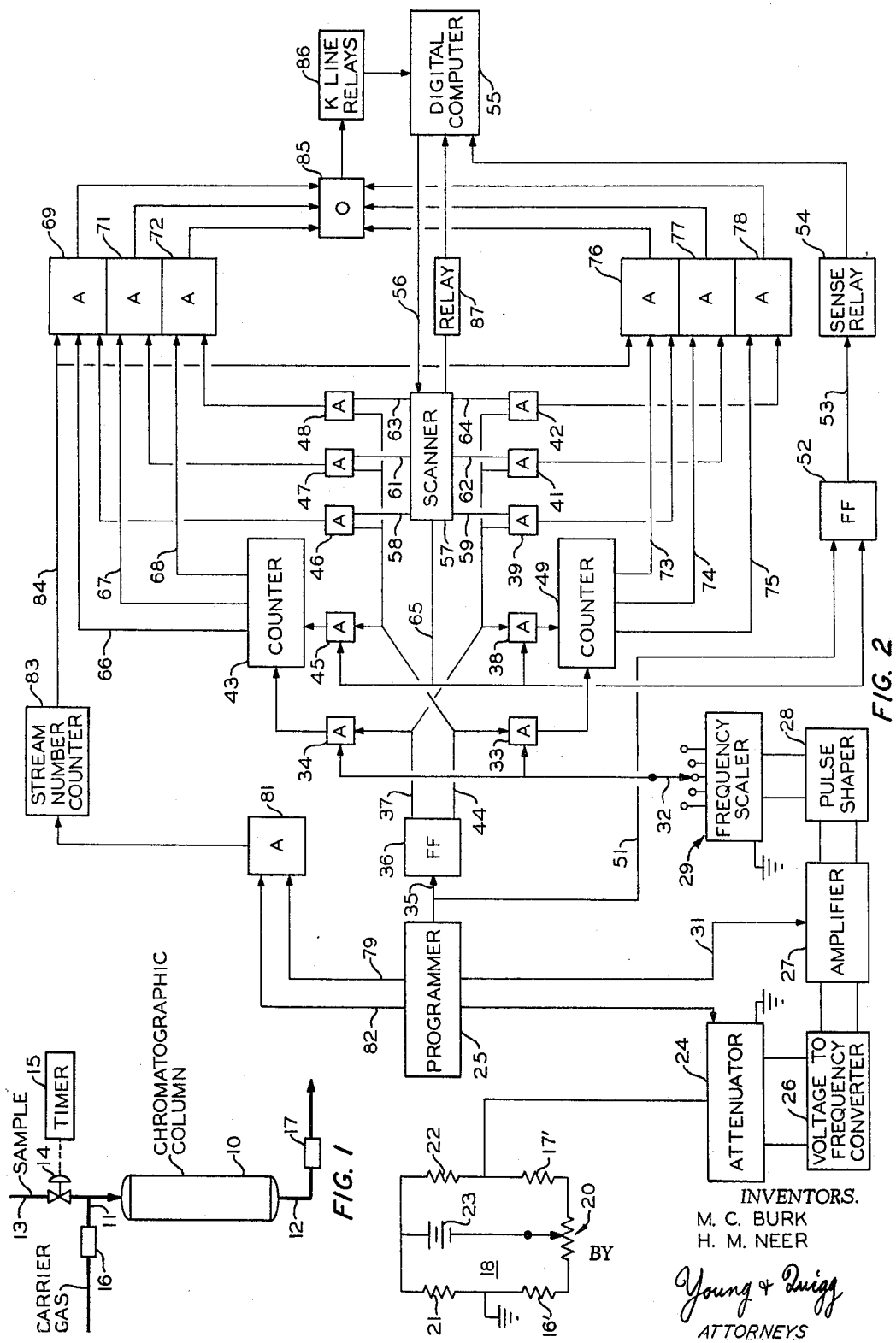

3,280,313
ELECTRICAL MEASURING APPARATUS
Marvin C. Burk and Harold M. Neer, Bartlesville, Okla., assignors to Phillips Petroleum Company, a corporation of Delaware
Filed Apr. 13, 1962, Ser. No. 187,277
9 Claims. (Cl. 235—151.35)

This invention relates to measuring a plurality of signals which are received in sequence.

Several types of analytical instruments are known which provide a plurality of output signals in sequence that are representative of the individual components of a material being analyzed. One such analyzer utilizes the principles of chromatography. A sample of a fluid mixture to be analyzed is introduced into a column which contains material that selectively retards passage therethrough of the individual components of the sample. A carrier gas is then directed through the column to elute the individual constituents in sequence. These constituents normally are detected by means of a thermal conductivity cell which measures the heat conductivity of the effluent gas from the column. The detector cell usually comprises a temperature sensitive resistance element which is connected in a bridge network so that an output voltage signal is established. Another type of analyzer which provides a plurality of output signals in sequence is a mass spectrometer. By varying either a magnetic field which deflects the charged particles or a potential which accelerates the charged particles toward the collector, the associated detector responds in sequence to charged particles having different masses. The detector circuit normally provides an output representative of the rate of impingement of charged particles on the collector.

Heretofore, it has been the general practice to measure or record directly the analog voltages established by the detecting circuits of such analyzers. However, these recorded voltages can not always be identified or interpreted readily by an operator in an industrial plant. In addition, it is often difficult for an operator to calculate the concentration of individual components of a sample mixture from the recorded voltages.

In accordance with the present invention, a system is provided for converting a plurality of voltage signals which are received in sequence into corresponding fluctuating signals, the frequencies of which are proportional to the amplitudes of the corresponding voltage signals. The total number of pulses of each individual signal is counted to provide an output signal representative of the corresponding input voltage signal. The counting of the individual signals can be performed by two counters alternately counting and reading out the count. In addition, the total number of pulses received during the complete analysis is counted and a signal representative thereof is established. The final output signals representative of the individual signals can then be divided by the total signal to determine the ratios of the individual signals to the total signal. When the input signals represent the concentrations of constituents of a fluid mixture, the output ratio signals are indicative of the percentages of these individual components in the fluid mixture.

Accordingly, it is an object of this invention to provide a method of and apparatus for measuring a plurality of signals which are received in sequence. Another object is to provide apparatus for measuring the percentages of components of fluid mixtures. A further object is to provide improved recording apparatus for use with analytical instruments. Still another object of the invention is to provide improved means for converting an analog signal into a form suitable for use in a digital computer. A further object of the invention is to provide an improved analog-to-digital conversion system. Yet another object of the invention is to convert a plurality of signals which are received in sequence from an analytical instrument into a form suitable for use in a digital computer.

Other objects, aspects and advantages of the invention will be apparent from a study of the disclosure, the drawings and the appended claims to the invention.

In the drawings, FIGURE 1 is a schematic representation of a chromatographic analyzer which is adapted to provide output signals of the type to be measured by the procedure of this invention, and FIGURE 2 is a schematic circuit drawing of the measuring apparatus of this invention.

Referring now to the drawing in detail and to FIGURE 1 in particular, there is shown a conventional chromatographic column 10 which is filled with a packing material that selectively retards passage therethrough of constituents of a fluid mixture to be analyzed. A carrier gas is introduced into the first end of column 10 through a conduit 11. A conduit 12 removes the effluent from column 10. A sample conduit 13, having a control valve 14 therein, communicates with the first end of column 10. Valve 14 is opened periodically for a preselected time interval by means of a timer 15 so as to introduce a predetermined volume of fluid sample to be analyzed into column 10. Although shown schematically, valve 14 can be any type of sample valve known in the art which permits the introduction of a predetermined volume of fluid sample.

First and second sensing elements 16 and 17 are disposed in respective conduits 11 and 12. These elements are adapted to compare a property of the fluid flowing through the two conduits to provide an indication of differences therebetween. These detecting elements are advantageously temperature sensitive resistance elements 16' and 17', as shown in FIGURE 2. The detecting elements are connected into a measuring circuit 18 which is described hereinafter in detail. Before the sample fluid is introduced into column 10, carrier gas flows through conduits 11 and 12 so that elements 16 and 17 respond to the same fluid and have identical outputs. Valve 14 is then opened to introduce a sample into column 10. The carrier gas elutes the constituents of the sample from the column in sequence so that element 17 responds sequentially to these individual constituents.

The resistances of temperature sensitive elements 16' and 17' are compared by means of a bridge network which is illustrated in FIGURE 2. First terminals of elements 16' and 17' are connected to the respective end terminals of a potentiometer 20. Resistance elements 21 and 22 are connected in series between the second terminals of elements 16' and 17'. A voltage source 23 is connected between the contactor of potentiometer 20 and the junction between elements 21 and 22. The junction between elements 16' and 21 is connected to ground. The junction between elements 17' and 22 is connected to the first input terminal of an attenuator circuit 24, the second input terminal of which is connected to ground.

When carrier gas alone is flowing through conduits 11 and 12, the bridge is balanced by adjusting the contactor of potentiometer 20 until the potential at the junction between elements 17' and 22 is zero. The presence of sample constituents in effluent conduit 12 changes the thermal conductivity of the gas flowing through this conduit so as to change the resistance of temperature sensitive resistance element 17'. This unbalances the bridge network so that a potential appears at the output terminal between elements 17' and 22.

Attenuator network 24 is controlled by programmer 25 such that the bridge unbalance signals representative of the individual components can be adjusted in magnitude to compensate for different thermal conductivities of these individual components. This network can comprise a plurality of voltage dividing networks which selectively reduce the amplitudes of the output signals from the bridge network. Programmer 25 selectively connects the bridge output signals to the proper voltage dividing network. In this manner, the output signals from the attenuator can be adjusted so as to be of approximately the same magnitude. Of course, this introduces a scaling factor which must be considered in interpreting the final output signals. The attenuator circuit can also be provided with an amplifier, if desired, to increase the output signals to a suitable amplitude.

The output signals from attenuator 24 are applied to the input of a voltage-to-frequency converter 26 which provides output alternating signals, the frequencies of which are directly proportional to the magnitudes of the input voltage. A suitable converter for this purpose is the DY–2210 Converter, manufactured by Dymec Inc., Palo Alto, California, and which is described in Control Engineering, March 1959, page 144. The number of pulses generated from the time the programmer output signal leaves the base line until it returns to the base line represents the time integral of the component peak. The output signal from converter 26 is applied through amplifier 27 and pulse shaper 28 to the input of frequency scaler 29. The output of amplifier 27 can be blocked to prevent the passage of stray pulses from voltage-to-frequency converter 26 during blank periods in the chromatogram or to skip certain component peaks in the analyzer output by transmitting an "off" signal from programmer 25 along line 31 to amplifier 27. Pulse shaper circuit 28 can be a conventional Schmitt trigger circuit to provide sharp output pulses to actuate the counters described hereinafter. Frequency scaler 29 comprises a plurality of frequency dividing circuits such that the frequencies of the output signals from the frequency dividing circuits are preselected fractions of the frequency F of the input signal. Thus, the frequencies of the output signals of the frequency dividing circuits can be, for example, F, $F/2$, $F/4$, $F/8$, etc.

The output of frequency scaler 29 is applied through switch 32 to first inputs of "and" circuits 33 and 34. Immediately after each component peak has appeared from the chromotographic column 10, a "component gate" signal is transmitted through line 35 to an input of flip flop circuit 36 to change flip flop circuit 36 to the alternate state regardless of the present state. In a first state flip flop circuit 36 produces a first output signal which is transmitted through line 37 to respective inputs of "and" circuits 34, 38, 39, 41 and 42. The application of the first output signal from flip flop circuit 36 to the second input of "and" circuit 34 gates "and" circuit 34 to the open state to pass the output of frequency scaler 29 to an input of counter 43. Upon the occurrence of the next "component gate" signal flip flop circuit 36 is changed to a second state and produces a second output signal which is transmitted along line 44 to respective inputs of "and" circuits 33, 45, 46, 47 and 48. The application of the second output signal of flip flop circuit 36 to the second input of "and" circuit 33 gates "and" circuit 33 to the open state to pass the output of frequency scaler 29 to an input of counter 49.

Each "component gate" signal from programmer 25 is also transmitted along line 51 to a first input of flip flop circuit 52. The trailing edge of the "component gate" signal actuates flip flop circuit 52 to a second state to transmit a signal through line 53 and relay 54 to an input of digital computer 55 as an indication that the count of one of the components has been completed and is ready to be read out. When digital computer 55 is ready to receive the component count, a "ready" signal is transmitted through line 56 to an input of scanner 57 to actuate the scanning operation.

In the scanning operation scanner 57 transmits a first gating signal through lines 58 and 59 to second inputs of "and" circuits 46 and 39, respectively; after a first predetermined time transmits a second gating signal through lines 61 and 62 to second inputs of "and" circuits 47 and 41, respectively; after a second predetermined time transmits a third gating signal through lines 63 and 64 to second inputs of "and" circuits 48 and 42, respectively; and finally transmits a "reset" signal through line 65 to respective inputs of "and" circuits 45 and 38 and flip flop circuit 52. Scanner 57 can be any suitable device such as the DY–2540 Scanner/Coupler, manufactured by Dymec Inc., Palo Alto, California.

The output of counter 43 is transmitted through cables 66, 67 and 68 to respective inputs of "and" circuits 69, 71 and 72, respectively, while the output of counter 49 is transmitted through cables 73, 74 and 75 to respective inputs of "and" circuits 76, 77 and 78, respectively. Where counter 43 has a twelve bit output, the two most significant bits are transmitted through cable 66, while the next five most significant bits are transmitted through cable 67 and the five least significant bits are transmitted through cable 68. Similarly where counter 49 has a twelve bit output, the most significant bits are transmitted through cable 73, the next five most significant bits through cable 74, and the five least significant bits through cable 75. A "stream number" signal is transmitted from programmer 25 through line 79 to a first input of "and" circuit 81. Each time a sample valve is actuated to provide a new sample for chromatographic column 10, a "sample" signal is transmitted from programmer 25 through line 82 to a second input of "and" circuit 81 to gate "and" circuit 81 to pass the "stream number" signal on line 79 to an input of stream number counter 83. The three bit output of counter 83 is transmitted through cable 84 to respective inputs of "and" circuits 69 and 76.

The outputs of "and" circuits 46, 47 and 48 are applied to second inputs of "and" circuits 69, 71 and 72, respectively, while the outputs of "and" circuits 39, 41 and 42 are applied to second inputs of "and" circuits 76, 77 and 78, respectively. Each of "and" circuits 69, 71, 72, 76, 77 and 78 comprises five individual "and" circuits corresponding to the five bits input thereof. When all inputs to any one of these individual "and" circuits are true, an output signal is transmitted through "or" circuit 85 and relays 86 to digital computer 55. Simultaneously a "transfer" signal is transmitted from scanner 57 through relay 87 to digital computer 55 to cause digital computer 55 to read the five bits on the relays 86.

Thus as the first component is eluted from column 10 and through sensing element 17, the bridge circuit produces an output signal representative thereof which is attenuated to the proper amplitude in attenuator 24, converted to a frequency signal in converter 26, amplified and shaped in amplifier 27 and pulse shaper 28, and scaled in frequency scaler 29. A "component gate" is transmitted by programmer 25 to flip-flop circuit 36 to actuate the flip flop circuit 36 to a first state, thereby gating "and" circuit 34 to pass the output of frequency scaler 29 to counter 43. At the conclusion of the component, flip flop circuit 52 is actuated to inform digital computer that a component count has been completed and is ready to be read out. Computer 55 transmits a "ready" signal to scanner 57. Flip flop 36 is actuated to the second state by the next "component gate" signal to gate "and" circuit 33 to pass the second component signal to counter 49 and to gate "and" circuits 46, 47 and 48 to pass the sequentially produced scanning signals from scanner 57 to "and" circuits 69, 71 and 72, thus sequentially passing the three bit output of counter 83 and the two most significant bits of the output of counter 43, the five next most significant bits of the output of counter 43, and the five least significant bits of the output of counter 43 to computer 55. At the conclusion of the readout of counter 43, scanner 57 transmits a "reset" signal through "and" circuit 45, which is gated open by the second state output of flip flop circuit 36, to counter 43 to reset counter 43 to zero, and to flip flop circuit 52 to discontinue the "component readouter relay" signal on line 53. The readout operation for counter 49 is similar to that of counter 43. Computer 55 can store each of the component signals, compute the total thereof, and compute each component signal as a percent of the total. The output of computer 55 can be recorded and/or utilized to control a manipulatable variable of the process.

Counters 43, 49 and 83 can be any suitable devices, such as an array of BC–1 binary counter modules manufactured by Packard Bell Computer Corp. of Los Angeles, California. While programmer 25 can be any suitable device, the presently preferred embodiment is disclosed and claimed in copending application Serial No. 174,543, filed February 20, 1962, now Patent No. 3,119,995, by M. C. Burk and C. E. Jones. Frequency scaler 29 can be any suitable device such as a binary counter cascade. While the invention has been illustrated through the use of "and" circuits, any suitable switching means can be utilized.

The recording and computing apparatus of this invention has been described in conjunction with a chromatographic analyzer. However, it is not limited thereto. For example, the accelerating potentials or the magnetic field of a mass spectrometer can be varied so that a series of output signals are provided which represent individual ions of the mixture being analyzed. These output signals can be supplied to the input of attenuator 24.

Reasonable variation and modification are possible within the scope of the disclosure, the drawings and the appended claims to the invention.

We claim:

1. Analysis apparatus comprising an analyzer adapted to provide a plurality of output voltages in sequence, each representative of a component of the material being analyzed; converter means to provide a fluctuating output signal corresponding to each of said plurality of output voltages, each said fluctuating output voltage comprising a series of pulses, the frequency of which varies proportionally with the amplitude of the respective one of said plurality of output voltages; means to apply the output voltages from said analyzer to the input of said converter means; first and second pulse counting means; means for alternately applying the fluctuating output signals from said converter means to said first and second pulse counting means; digital computing means; and means for alternately transmitting the output of each of said first and second pulse counting means to said digital computing means.

2. Apparatus in accordance with claim 1 wherein said digital computing means comprises means for determining the total of the outputs of said first and second pulse counting means and for dividing each output signal of said first and second pulse counting means by said total.

3. Analysis apparatus comprising an analyzer adapted to provide a plurality of output voltages in sequence, each representative of a component of the material being analyzed; converter means to provide a fluctuating output signal corresponding to each of said plurality of output voltages, each said fluctuating output voltage comprising a series of pulses, the frequency of which varies proportionally with the amplitude of the respective one of said plurality of output voltages; means to apply the output voltages from said analyzer to the input of said converter means; first and second pulse counting means; means for alternately applying the fluctuating output signals from said converter means to said first and second pulse counting means; digital computing means; and means for transmitting to said digital computing means the digital output signal of the one of said first and second pulse counting means other than the one to which the fluctuating output signal from said converter means is being applied.

4. Apparatus in accordance with claim 3 wherein said analyzer is a chromatographic analyzer.

5. Analysis apparatus comprising an analyzer adapted to provide a plurality of output voltages in sequence, each representative of a component of the material being analyzed; converter means to provide a fluctuating output signal corresponding to each of said plurality of output voltages, each said fluctuating output voltage comprising a series of pulses, the frequency of which varies proportionally with the amplitude of the respective one of said plurality of output voltages; means to apply the output voltages from said analyzer to the input of said converter means; first and second pulse counting means; switching means for alternately applying the fluctuating output signals from said converter means to said first and second pulse counting means; digital computing means; switching means for alternately connecting the outputs of said first and second pulse counting means to an input of said digital computing means, whereby a fluctuating output signal from said converter means is being applied to one of said first and second pulse counting means while the output of the other of said first and second pulse counting means is connected to said input of said digital computing means.

6. Analysis apparatus comprising an analyzer adapted to provide a plurality of output voltages in sequence, each representative of a component of the material being analyzed; converter means to provide a fluctuating output signal corresponding to each of said plurality of output voltages, each said fluctuating output voltage comprising a series of pulses, the frequency of which varies proportionally with the amplitude of the respective one of said plurality of output voltages; means to apply the output voltages from said analyzer to the input of said converter means; first and second pulse counting means; timing means; first and second "and" circuits, means for applying the fluctuating output signals from said converter means to first inputs of said first and second "and" circuits; means connecting the outputs of said first and second "and" circuits to the inputs of said first and second pulse counting means, respectively; means responsive to said timing means for alternately gating said first and second "and" circuits to pass the fluctuating output signal from said converter means to the respective one of said first and second pulse counting means; a first plurality of "and" circuits having first inputs thereof connected to the respective outputs of said first pulse counting means; a second plurality of "and" circuits having first inputs thereof connected to the respective outputs of said second pulse counting means; means for applying a gating pulse to the second inputs of groups of said first plurality of "and" circuits in sequence; means for applying a gating pulse to the second inputs of groups of said second plurality of "and" circuits in sequence; digital computing means; and means connecting the outputs of said first and second plurality of "and" circuits to inputs of said digital computing means.

7. Apparatus for transforming and recording a plurality of voltages which are received in sequence comprising converter means to provide a fluctuating output signal corresponding to each of said plurality of voltages, each said fluctuating output signal comprising a plurality of pulses, the frequency of which varies proportionally with the amplitude of the respective one of said plurality of voltages, and said converter means being adapted to receive said plurality of voltages; first and second pulse counting means; means for alternately applying the fluctuating output signals from said converter means to said first and second pulse counting means; digital computing means; and means for alternately transmitting the output of each of said first and second pulse counting means to said digital computing means.

8. Apparatus for transforming a plurality of groups of pulses which are received in sequence which comprises first and second pulse counting means; timing means; first and second "and" circuits; means for applying said groups of pulses to first inputs of said first and second "and" circuits; means connecting the outputs of said first and second "and" circuits to the inputs of said first and second pulse counting means, respectively; means responsive to said timing means for alternately gating said first and second "and" circuits to pass alternate groups of pulses to each respective one of said first and second pulse counting means; a first plurality of "and" circuits having first inputs thereof connected to the respective outputs of said first pulse counting means; a second plurality of "and" circuits having first inputs thereof connected to the respective outputs of said second pulse counting means; means for applying a gating pulse to the second inputs of groups of said first plurality of "and" circuits in sequence; means for applying a gating pulse to the second inputs of groups of said second plurality of "and" circuits in sequence; digital computing means; and means connecting the outputs of said first and second plurality of "and" circuits to inputs of said digital computing means.

9. Analysis apparatus comprising a chromatographic analyzer adapted to provide a plurality of output voltages in sequence, each representative of a component of the material being analyzed; converter means to provide a fluctuating output signal corresponding to each of said plurality of output voltages, each said fluctuating output voltage comprising a series of pulses, the frequency of which varies proportionally with the amplitude of the respective one of said plurality of output voltages; means to apply the output voltages from said chromatographic analyzer to the input of said converter means; first and second binary counters, each having an input and a plurality of bit outputs; first and second "and" circuits; means for applying the fluctuating output signals from said converter means to first inputs of said first and second "and" circuits; means connecting the outputs of said first and second "and" circuits to the inputs of said first and second binary counters, respectively; programming means; means responsive to said programming means for alternately applying a first gated signal to the second input of said first "and" circuit and a second gating signal to the second input of said second "and" circuit to pass the fluctuating output signals corresponding to the even numbered ones of said plurality of output voltages to the input of said first binary counter and to pass the fluctuating output signals corresponding to the odd numbered ones of said plurality of output voltages to the input of said second binary counter; a first plurality of "and" circuits; means for connecting each respective bit output of said first binary counter to the first input of the corresponding one of said first plurality of "and" circuits; a second plurality of "and" circuits; means for connecting each respective bit output of said second binary counter to the first input of the corresponding one of said second plurality of "and" circuits; an "or" circuit; means for connecting the output of each of said first and second pluralities of "and" circuits to a respective input of said "or" circuit; a digital computer having a signal input; means for connecting the output of said "or" circuit to said signal input of said digital computer; scanning means; means responsive to said second gating signal and a first series of output signals from said scanning means for selectively actuating said first plurality of "and" circuits; means responsive to said first gating signal and a second series of output signals from said scanning means for selectively actuating said second plurality of "and" circuits; means responsive to said second gating signal and a reset signal from said scanning means for resetting said first binary counter; and means responsive to said first gating signal and said reset signal from said scanning means for resetting said second binary counter.

References Cited by the Examiner
UNITED STATES PATENTS

| | | | |
|---|---|---|---|
| 2,793,806 | 5/1957 | Lindesmith | 235—154 X |
| 2,796,314 | 6/1957 | Bishop et al. | 235—92 |
| 2,835,868 | 5/1958 | Lindesmith | 235—92 |
| 3,005,911 | 10/1961 | Burhans | 235—151 |
| 3,097,520 | 7/1963 | Thompson | 73—27 |

MALCOLM A. MORRISON, *Primary Examiner.*

K. W. DOBYNS, C. L. WHITHAM, *Assistant Examiners.*